(12) United States Patent
Liang et al.

(10) Patent No.: US 9,871,467 B2
(45) Date of Patent: Jan. 16, 2018

(54) RESONANT CONVERTERS INCLUDING FLYING CAPACITORS

(71) Applicant: ABB Schweiz AG, Baden (CH)

(72) Inventors: Jiaqi Liang, Cary, NC (US); Harish Suryanarayana, Raleigh, NC (US); Jukka-Pekka Kittila, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/159,227

(22) Filed: May 19, 2016

(65) Prior Publication Data
US 2017/0338748 A1 Nov. 23, 2017

(51) Int. Cl.
*H02M 7/537* (2006.01)
*H02M 3/335* (2006.01)

(52) U.S. Cl.
CPC ....... *H02M 7/537* (2013.01); *H02M 3/33569* (2013.01)

(58) Field of Classification Search
CPC .. H02M 7/487; H02M 7/5388; H02M 7/5387; H02M 2007/4811; Y92B 70/1441
USPC ..... 363/16–20, 21.03, 39, 56.01, 95, 97, 98, 363/131, 132
See application file for complete search history.

(56) References Cited

U.S. PATENT DOCUMENTS

| | | | |
|---|---|---|---|
| 5,432,695 A | 7/1995 | Vlatkovic et al. | |
| 5,574,636 A | 11/1996 | Lee et al. | |
| 5,717,584 A * | 2/1998 | Rajashekara | H02M 7/5387 363/132 |
| 6,058,031 A * | 5/2000 | Lyons | H02M 7/487 363/132 |
| 6,144,567 A * | 11/2000 | Asplund | H02J 3/36 363/34 |
| 7,126,833 B2 * | 10/2006 | Peng | H02M 7/4826 363/131 |
| 8,199,544 B2 | 6/2012 | Krause et al. | |
| 8,737,098 B2 * | 5/2014 | Bendre | H02M 7/49 363/71 |

(Continued)

OTHER PUBLICATIONS

R.W. De Doncker et al., "The Auxiliary Resonant Commutated Pole Converter," General Electric Company, 1990, 8 pgs., Schenectady, New York.

(Continued)

*Primary Examiner* — Rajnikant Patel
(74) *Attorney, Agent, or Firm* — Taft Stettinius & Hollister LLP

(57) ABSTRACT

Unique systems, methods, techniques and apparatuses of zero-voltage transition pulse width modulation resonant converters are disclosed. One exemplary embodiment is a zero-voltage transition PWM resonant converter comprising a DC bus, a first switching device, a second switching device, a resonant tank circuit, an auxiliary circuit having a flying capacitor and a plurality of auxiliary switching devices, and a controller. The controller is structured to control the first switching device, the second switching device, and the plurality of auxiliary switching devices to provide resonant operation of the tank circuit effective to provide a substantially zero voltage condition across the first switching device when turning the first switching device on or off and to provide a substantially zero voltage condition across the second switching device when turning the second switching device on or off.

20 Claims, 6 Drawing Sheets

(56) References Cited

U.S. PATENT DOCUMENTS

| | | | |
|---|---|---|---|
| 9,543,855 B2* | 1/2017 | Soeiro | H02M 7/537 |
| 2004/0052023 A1 | 3/2004 | Asplund | |
| 2012/0218795 A1* | 8/2012 | Mihalache | H02M 7/487 |
| | | | 363/97 |

OTHER PUBLICATIONS

J.S. Lai et al., "Source and Load Adaptive Design for High-Power Soft-Switching Inverter," IEEE Transactions Power on Electronics, vol. 21, No. 6, Nov. 2006, 9 pgs., USA.

Y. Li, "Unified Zero Current Transition Techniques for High Power Three Phase PWM Inverter," PhD Dissertation, Virginia Polytechnic Institute and State University, 2002, 305 pgs., Blacksburg, Virginia.

* cited by examiner

RESONANT CONVERTERS INCLUDING FLYING CAPACITORS

BACKGROUND

The present disclosure relates generally to resonant converters. Resonant converters, including zero-voltage transition (ZVT) pulse width modulation (PWM) converters and zero-current transition converters (ZCT) PWM converters offer a number of benefits including, for example, allowing high switching frequencies, reducing electromagnetic noise emission, and allowing use of smaller passive components. Existing resonant converters, including the foregoing examples, suffer from a number of shortcomings and disadvantages. There remain unmet needs including inductor saturation, post commutation oscillation, voltage imbalance. For instance, some ZVT PWM converters include coupled inductors which are prone to saturation during converter operation and cause post commutation oscillation. In another example, some ZVT PWM converters use neutral point connections which cannot balance voltage easily and do not work for DC/DC power conversion. There is a significant need for the unique apparatuses, methods, systems and techniques disclosed herein.

SUMMARY

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Exemplary embodiments include unique systems, methods, techniques and apparatuses for zero-voltage transition pulse width modulation resonant converters. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
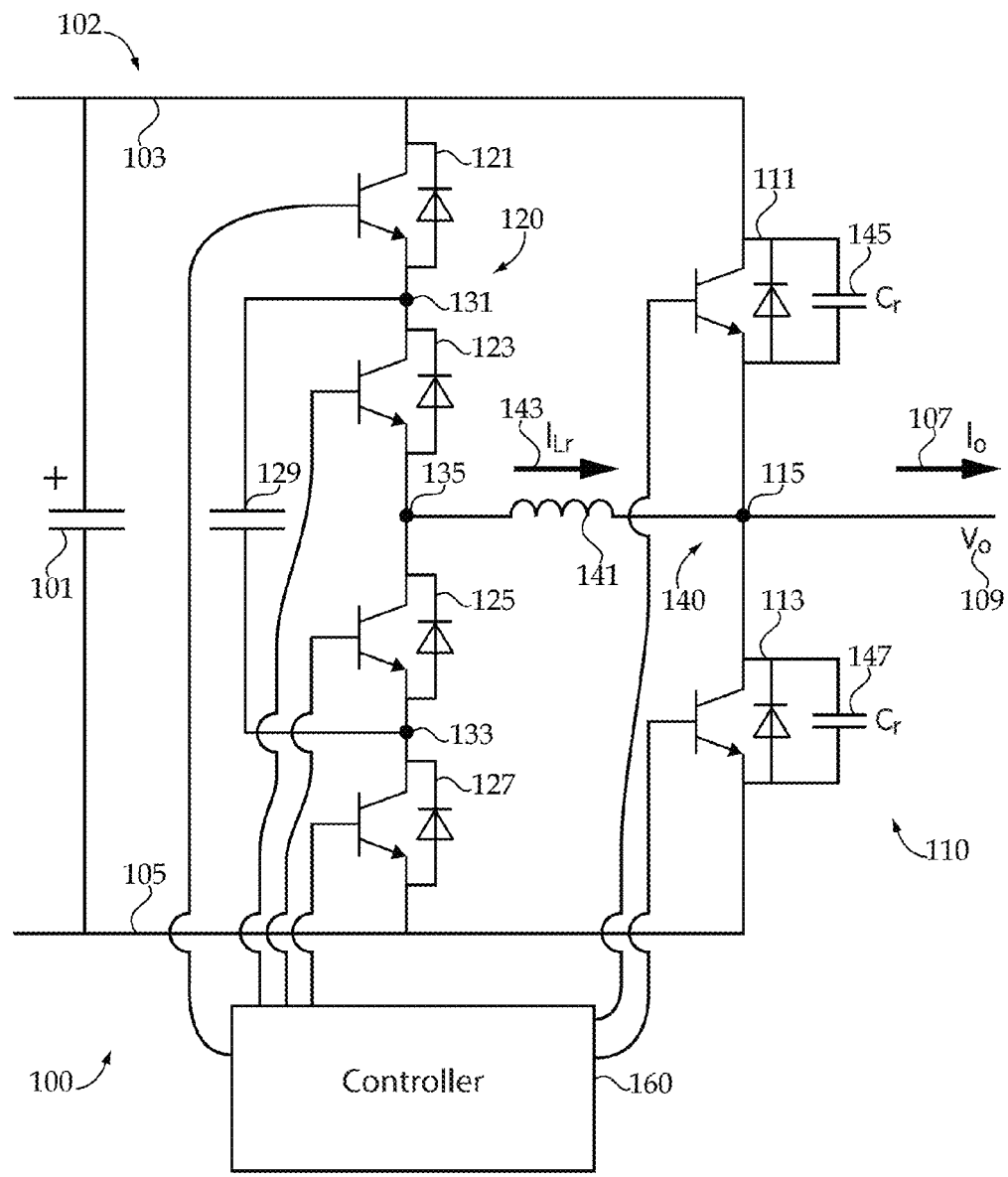
FIG. 1 illustrates an exemplary converter.
Figure 2:
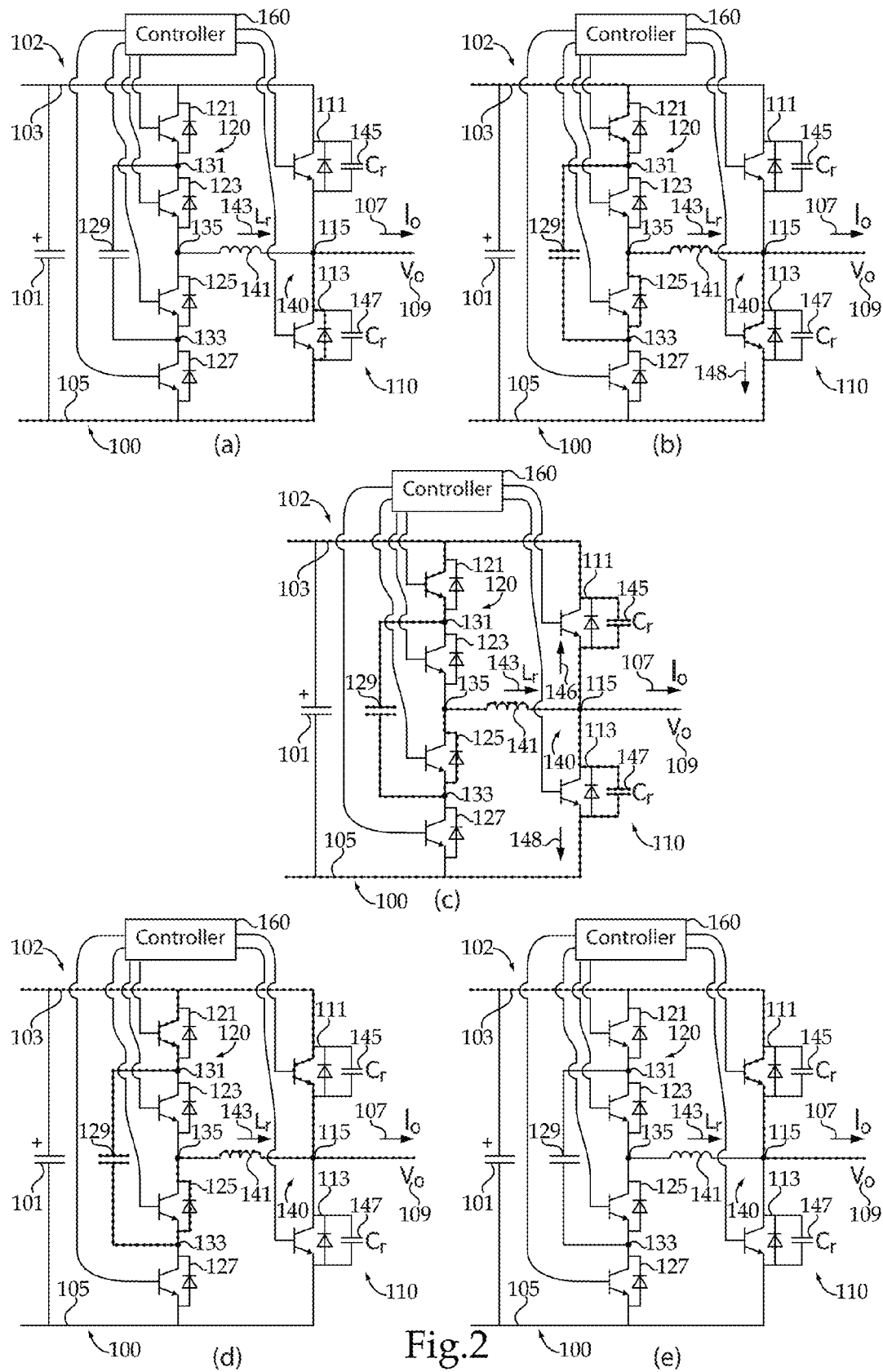
FIG. 2 illustrates current flow through the exemplary converter of FIG. 1.

With reference to FIGS. 1 and 2 there is illustrated an exemplary ZVT PWM resonant converter 100. It shall be appreciated that converter 100 may be implemented in a variety of applications, including electric vehicles, hybrid vehicles, and medium voltage direct current power distribution to name but a few examples. Converter 100 is coupled to a direct current (DC) power source having a positive pole and a negative pole, and structured to generate an output voltage $V_{dc}$. In some embodiments, converter 100 is structured to receive DC power from the DC power source, convert the DC power to AC power, and provide the AC power to a load. In some embodiments, converter 100 is structured to receive DC power at one voltage from the DC power source, convert the DC power to DC power at a second voltage, and provide the converted DC power to a load.

Converter 100 includes a DC bus 102 having a DC bus positive rail 103 coupled to the positive pole of the DC power source and a DC bus negative rail 105 coupled to the negative pole. In the illustrated embodiment, a smoothing capacitor 101 is coupled between rail 103 and rail 105. The smoothing capacitor 101 is structured to reduce transients on the DC bus caused by fluctuations in the output power of the DC power source and converter switching operations described herein. In some embodiments, smoothing capacitor 101 is not included in converter 100.

Converter 100 further includes a pair of primary switching devices 110 coupled in parallel to the DC power source by way of the DC bus 102. Device pair 110 includes a first primary switching device 111 having a first terminal electrically coupled to rail 103 and a second terminal electrically coupled to an output node 115. In the illustrated embodiment, switching device 111 is an insulated-gate bipolar transistor (IGBT) having a parallel coupled freewheeling diode, the IGBT being rated for $V_{dc}$. Switching device 111 may be another type of semiconductor switching device, such as an integrated gate-commutated thyristor (IGCT), a metal-oxide-semiconductor field-effect transistor (MOSFET), or a silicon carbide (SiC) MOSFET to name several examples. It shall be appreciated that the other primary switching devices described herein may include the same or similar features as primary switching devices 111 although these features may not be re-stated.

Device pair 110 includes a second primary switching device 113 having a first terminal coupled to output node 115 and a second terminal coupled to rail 105. The output node 115 is electrically coupled to the load which is structured to receive power having an output current 107 at an output voltage 109 from output node 115.

Converter 100 further includes an auxiliary flying capacitor (FC) circuit 120 having a plurality of FC switching devices 121, 123, 125, and 127, a flying capacitor 129, an FC circuit output node 135, and flying capacitor nodes 131 and 133. It shall be appreciated that the features of switching device 111 may be employed in connection with switching devices 121, 123, 125, and 127. A first terminal of FC switching device 121 is coupled to DC bus positive rail 103. A second terminal of FC switching device 121 is coupled to flying capacitor node 131. A first terminal of switching device 123 is coupled to flying capacitor node 131 and a second terminal of switching device 123 is coupled to FC output node 135. A first terminal of switching device 125 is coupled to FC output node 135 and a second terminal of switching device 125 is coupled to flying capacitor node 133. A first terminal of switching device 127 is coupled to flying capacitor node 133 and a second terminal of switching device 127 is coupled to negative bus rail 105. The cathode of the flying capacitor 129 is coupled to flying capacitor node 131 and the anode of flying capacitor 129 is coupled to flying capacitor node 133. Each of the FC switching devices 121, 123, 125, and 127 may be rated for one-half $V_{dc}$.

Converter 100 additionally includes a resonant tank circuit 140 having a first resonant non-polarized capacitor 145 coupled in parallel to switching device 111 such that a terminal of the non-polarized capacitor 145 is coupled to the output node 115, a second resonant non-polarized capacitor 147 coupled in parallel with switching device 113 such that a terminal of the non-polarized capacitor 147 is coupled to output node 115. Circuit 140 additionally includes a resonant inductor 141 electrically coupled between FC output node 135 and output node 115. As described in more detail below, the auxiliary flying capacitor circuit 120 is structured to selectively provide a resonating current 143 which flows from the FC output node 135 to the output node 115.

The sizing of the passive components of converter 100 will depend on the particular application, taking into consideration change in voltage at peak load, duty cycle range, peak resonant current, and change in voltage during one resonant switching phase. For example, converter 100 coupled to a 750 V DC power source and generating a combined resonant peak current and load peak current of 210 A may utilize 0.1 uF resonant capacitors 145 and 147, a 4 uH resonant inductor 141, and a 20 uF flying capacitor 129. In another example, converter 100 coupled to a 750 V DC power source and generating a combined resonant peak current and load peak current of 1270 A may utilize a 0.6 uF resonant capacitors 145 and 147, a 0.7 uH resonant inductor 141, and a 20 uF flying capacitor 129. The flying capacitor 129 may be a film capacitor. It shall be appreciated that the size of flying capacitor 129 is significantly smaller than the capacitors in a conventional flying capacitor multilevel converter due to the fact that the flying capacitor conducts in less than 10 us per switching cycle.

Converter 100 additionally includes a controller 160 electrically coupled to FC switching devices 121, 123, 125, and 127, as well as primary switching devices 145 and 147. Controller 160 is structured to transmit a plurality of pulse width modulation signals to operate FC switching devices 121, 123, 125, and 127, and primary switching devices 145 and 147. The pulse width modulation signals cause either the closing of the switching device to allow current to flow through the switching device or the opening of the device to prevent current from flowing through the device in at least one direction. Controller 160 is structured to operate the pair of primary switching devices 110 by opening and closing primary switching devices 111 and 113 so as to convert DC power from the DC power source into output power and transmit the output power to the load.

Controller 160 is additionally structured to control the FC switching devices 121, 123, 125, and 127, so as to provide resonant operation of the resonant tank circuit 140 effective to provide a substantially zero voltage condition across primary switching device 111 when opening and closing switching device 111 and to provide a substantially zero voltage condition across primary switching device 113 when opening and closing switching device 113. In a preferred embodiment, the substantially zero voltage condition is zero volts. In other embodiments, the substantially zero voltage condition is a small percentage of $V_{dc}$. For example, a substantially zero voltage condition may be a voltage less than 20% of $V_{dc}$.

Controller 160 is structured to operate the switching devices 121, 123, 125, and 127 of auxiliary flying capacitor circuit 120 to charge the flying capacitor 129. The particular FC switching device that controller 160 closes to provide current from the DC power source to the flying capacitor 129 is determined based on the primary switch to be closed under substantially zero-voltage conditions and the voltage across the flying capacitor 129 relative to $V_{dc}$. For example, when the controller 160 is preparing to operate switching device 111 under substantially zero-voltage conditions, controller closes FC switching device 121 if the flying capacitor 129 voltage is less than one-half $V_{dc}$ and closes FC switching device 123 if the flying capacitor 129 voltage is greater than one-half $V_{dc}$. When controller 160 is preparing to operate switching device 113 under substantially zero-voltage conditions, controller closes FC switching device 127 if the flying capacitor 129 voltage is less than one-half $V_{dc}$ and closes FC switching device 125 if the flying capacitor 129 voltage is greater than one-half $V_{dc}$. While other converters described hereinafter may not specifically describe features analogous to the features of converter 100, such features may nonetheless be employed in connection with the described converters.

With continuing reference to FIG. 2, there is illustrated a series of switching operations which allow controller 160 to operate primary switching device 111 under substantially zero-voltage switching conditions. In the initial state of converter 100 as shown in FIG. 2(a), output current 107 is flowing from the negative pole of the DC power source to the load by way of the freewheeling diode of primary switching device 113. As shown in FIG. 2(b), controller 160 then closes FC switching device 121, allowing current 143 to flow through resonant inductor 143 by of flying capacitor 129 and the freewheeling diode of FC switching device 125, causing current 143 to increase almost linearly. Current 143 is allowed to increase until current 143 exceeds the load current, at which time controller closes primary switching device 113 in order to charge resonating inductor 141. The resonant action of converter 100 requires current 143 to rise and fall as a part of the resonant process wherein energy is exchanged between capacitors 145 and 147 and inductor 141. In this topology, zero voltage switching cannot be achieved without charging inductor 141 to assist in charging the capacitors. As shown in FIG. 2(c), controller 160 then opens primary switching device 113 in a substantially zero-voltage condition, allowing the resonant tank circuit 140 to begin resonating, causing the output voltage 109 to change from 0 V to $V_{dc}$ at a rate limited by resonating capacitors 145 and 147. As shown in FIG. 2(d), the output voltage increases to $V_{dc}$, at which point primary switching device 111 is closed under substantially zero-voltage conditions. Current 143 begins to decrease to 0 A. As shown in FIG. 2 (e), when current 143 reduces to 0 A, FC switching device 121 is opened under zero current conditions.

Figure 3:
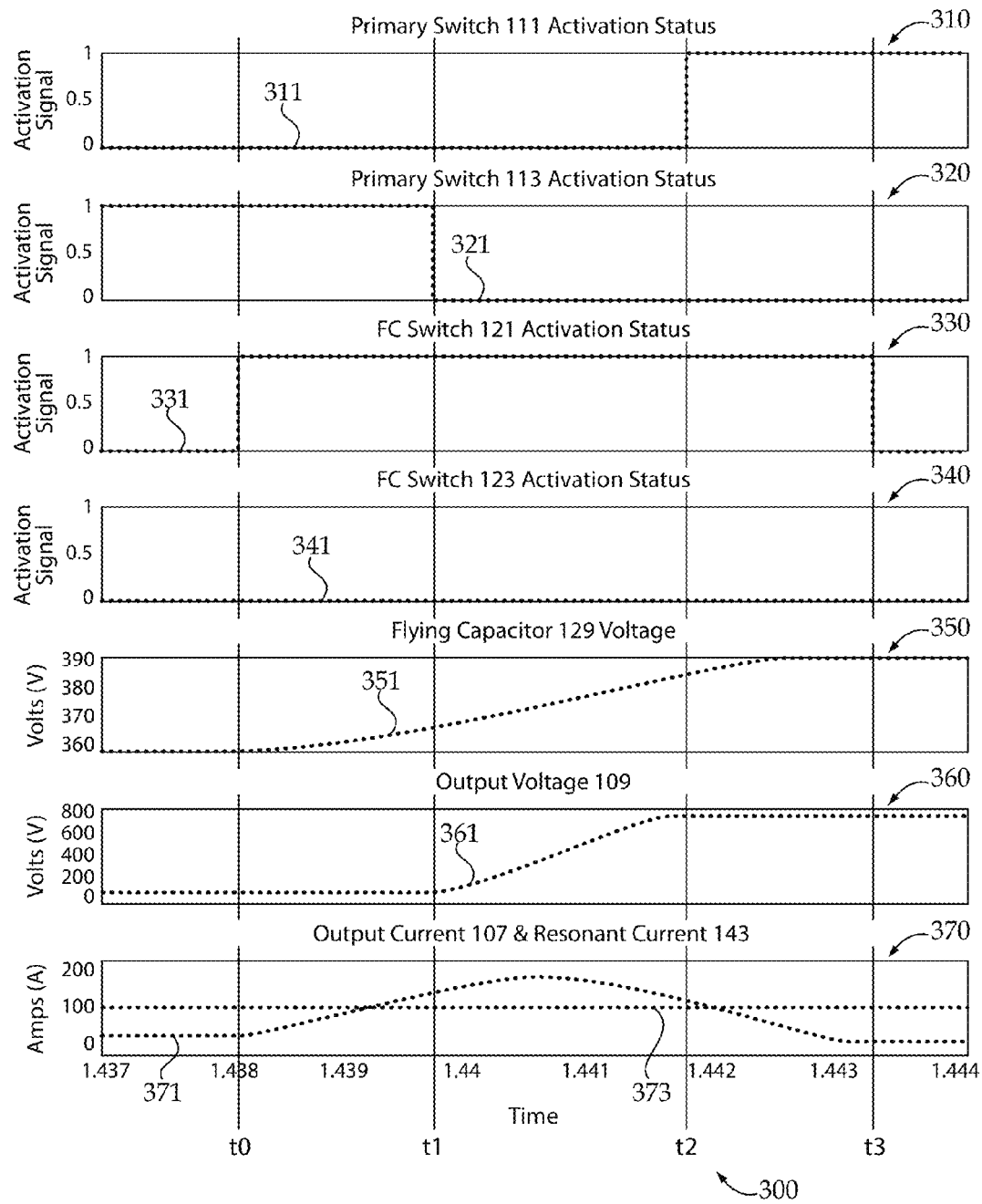
FIG. 3 is a plurality of graphs illustrating a substantially zero voltage condition across a primary switch of the exemplary converter of FIG. 1.

With reference to FIG. 3, there are illustrated a plurality of graphs 300 illustrating a substantially zero-voltage switching conditions of converter 100 during the operation of switching device 111. The plurality of graphs 300 depict a time period during the operation of converter 100 between 1.437 milliseconds and 1.444 milliseconds, the time period having four identified times: t0, t1, t2, and t3. Times t0-t3 correspond to FIG. 2(b)-(e), respectively. The graphs 300 include primary switch 111 activation status graph 310, primary switch 113 activation status graph 320, FC switch 121 activation status graph 330, FC switching device 123 activation status graph 340, flying capacitor voltage graph 350, output voltage graph 360, and output and resonant current graph 370.

At time t0, controller 160 transmits a close signal to FC switching device 121. Closing switching device 121 causes current to flow from the DC power source to the flying capacitor, charging the capacitor and generating a resonating current 143. The charging of the capacitor is illustrated by line 351 in graph 350 and the rise of the resonating current 143 is illustrated by line 371 of graph 370. At time t1, controller 160 transmits an opening signal to switching device 113 in response to the resonating current 143 exceed the output current 107, the output current being illustrated by line 373 in graph 370. Once switching device 113 is open, the output voltage 109, illustrated by line 361 in graph 360, begins to increase from 0 V to $V_{dc}$. At time t2, controller 160 transmits a closing signal to switching device 111 in response to the output voltage become substantially equal to $V_{dc}$. At time t3, controller 160 transmits an opening signal to FC switching device 121 in response to the resonating current 143 being reduced to 0 A, as shown by line 371 of graph 370. Thus, switching device 121 is opened during a substantially zero-current condition.

Figure 4:
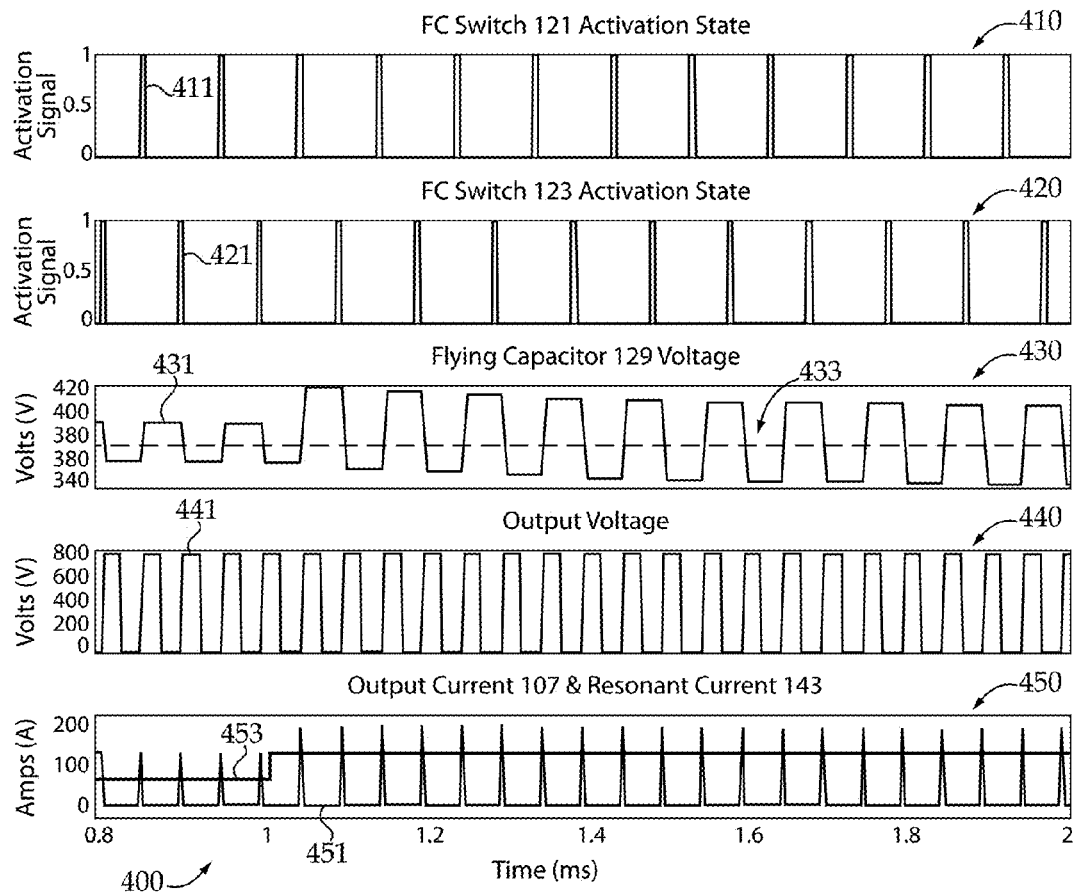
FIG. 4 is a plurality of graphs illustrating the operation of the flying capacitor circuit of the exemplary converter of FIG. 1.

With reference to FIG. 4, there is a plurality of graphs 400 illustrating the charging of a flying capacitor such as the flying capacitor 129 in converter 100 of FIG. 1 following a change in output current load at time 1 ms. The graphs 400 include an FC switch 121 activation state graph 410, an FC switching 123 activation state graph 420, a flying capacitor 129 voltage graph 420; an output voltage graph 440, and a resonant and output current graph 450. As shown in graphs 410, controller 160 alternatively activates FC switches 121 and 123 by transmitting an activation impulse to switching device 121, as illustrated by line 411, followed by transmitting an activation impulse to switching device 123, as illuminated by line 421. By alternatively activating FC switching devices 121 and 123, the voltage across flying capacitor 129 is balanced, as illustrated by line 431 of graph 430 which indicates the flying capacitor 129 voltage is maintained at a level close to one-half $V_{dc}$, the one-half $V_{dc}$ voltage level being illustrated by dashed line 433 of graph 430. Graph 440 illustrates the output voltage, as depicted by line 441, as the flying capacitor 129 is being discharged and charged. Graph 450 illustrates the resonant current 143, as depicted by line 451, flowing while the flying capacitor 129 is being charged and discharged. Graph 450 also includes line 453 which depicts the output current increasing at time 1 ms.

Figure 5:
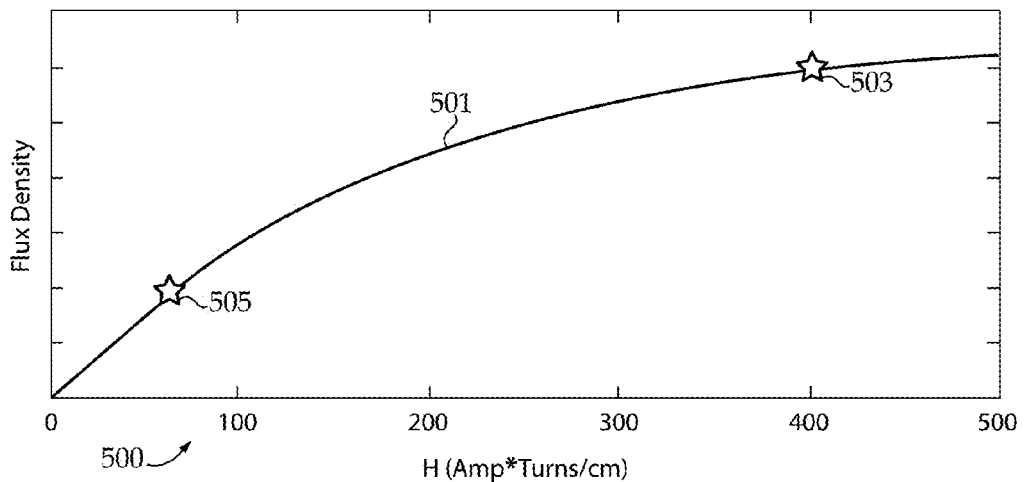
FIG. 5 is a graph illustrating the B-H curve for a resonant inductor of an exemplary converter.

With reference to FIG. 5, there is a graph 500 illustrating a B-H curve 501 of an exemplary resonant inductor such as the resonant inductor 141 of converter 100 in FIG. 1. As illustrated in graph 370 of FIG. 3, circuit resonance begins after the output load current 107 exceeds the resonating current 143. Because the peak resonant current 143 is independent of the output load current 107, the difference between peak resonant current 143 and output load current 107 could cause significant converter losses during periods of low output load current. In some applications, the size of resonant inductor 141 may be increased, reducing the resonant current in light load conditions. For example, resonant inductor 141 could be made of soft-saturation magnetic material, such as nickel-iron powder cores. FIG. 5 illustrates the B-H curve of a nickel-iron powder material. When the output current 107 is high, resonance begins at a higher flux density level, such as point 503 on B-H curve 501 where the commutation inductance is low. When the output current 107 is low, resonance begins at a lower flux density level, such as point 505 on B-H curve 501 where the commutation inductance is approximately three times higher than the commutation inductance at point 503.

Figure 6:
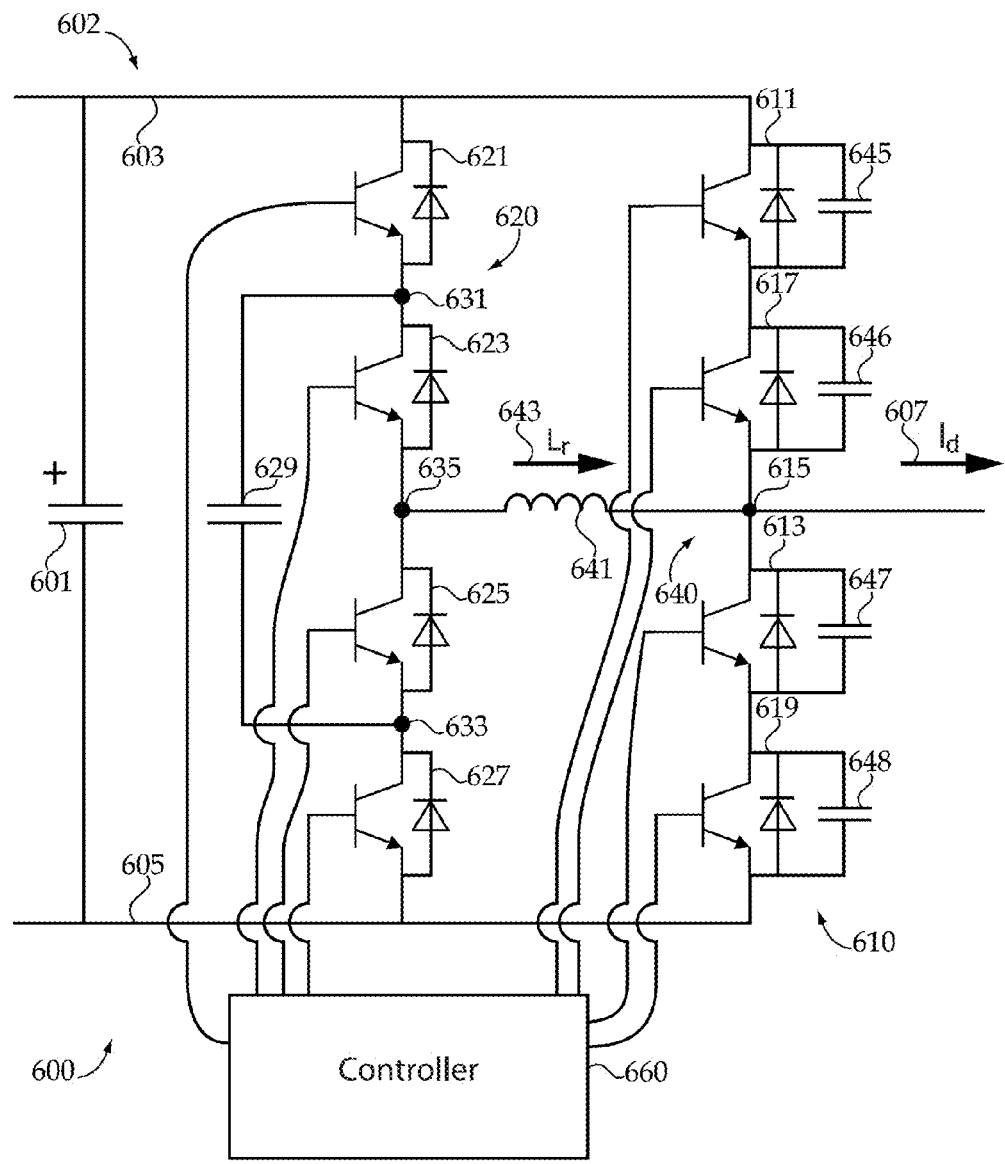
FIGS. 6 and 7 illustrate additional exemplary converters.

With reference to FIG. 6, there is illustrated an exemplary ZVT PWM resonant converter 600. It shall be appreciated that any or all of the foregoing features of converter 100 may also be present in converter 600. Converter 600 is coupled to a direct current (DC) power source having a positive pole and a negative pole with a voltage difference of $V_{dc}$. Converter 600 includes a DC bus 602 having a DC bus positive rail 603 coupled to the positive pole of the DC power source and a DC bus negative rail 605 coupled to the negative pole. In the illustrated embodiment, a smoothing capacitor 601 is coupled between rail 603 and rail 605.

Converter 600 further includes a plurality of primary switching devices 610 coupled in parallel to the DC power source by way of the DC bus 602. The pair 610 includes a first primary switching device 611 having a first terminal electrically coupled to rail 603 and a second terminal electrically coupled to a first terminal of a second primary switching device 611. A second terminal of the second primary switching device 617 is electrically coupled to an output node 615. A first terminal of a third primary switching device 613 is coupled to output node 615 and the second terminal of the third primary switching device 613 is coupled to a first terminal of a fourth primary switching device 619 and the second terminal of the fourth primary switching device 619 is coupled to the negative DC bus rail 605.

Converter 600 further includes an auxiliary flying capacitor (FC) circuit 620 having a plurality of FC switching devices 621, 623, 625, and 627, a flying capacitor 629, an FC circuit output node 635, and flying capacitor nodes 631 and 633. A first terminal of FC switching device 621 is coupled to DC bus positive rail 603. A second terminal of FC switching device 621 is coupled to flying capacitor node 631. A first terminal of switching device 623 is coupled to flying capacitor node 631 and a second terminal of switching device 623 is coupled to FC output node 635. A first terminal of switching device 625 is coupled to FC output node 635 and a second terminal of switching device 625 is coupled to flying capacitor node 633. A first terminal of switching device 627 is coupled to flying capacitor node 633 and a second terminal of switching device 627 is coupled to negative bus rail 605. The cathode of the flying capacitor 629 is coupled to flying capacitor node 631 and the anode of flying capacitor 629 is coupled to flying capacitor node 633. Each of the FC switching devices 621, 623, 625, and 627 may be rated for half the voltage across the DC power source.

Converter 600 additionally includes a resonant tank circuit 640 having a first resonant capacitor 645 coupled in parallel to switching device 611, a second resonant capacitor 646 coupled in parallel to switching device 617, a third resonant capacitor 647 coupled in parallel with switching device 613, and a fourth resonant capacitor 648 coupled in parallel with switching device 619. Circuit 640 additionally includes a resonant inductor 641 electrically coupled between FC output node 635 and output node 615.

Converter 600 additionally includes a controller 660 electrically coupled to FC switching devices 621, 623, 625, and 627, as well as primary switching devices 645 and 647. In addition to the features of controller 160 described with respect to converter 100, controller 660 is structured to control switching devices 611 and 617 simultaneously as well as being structured to control switching devices 613 and 619 simultaneously such that each of switching devices 611, 617, 613, and 619 may be rated for a voltage equal to one-half $V_{dc}$.

While other converters described hereinafter may not specifically describe features analogous to the features of converter 600, such features may nonetheless be employed in connection with the described converters.

Figure 7:
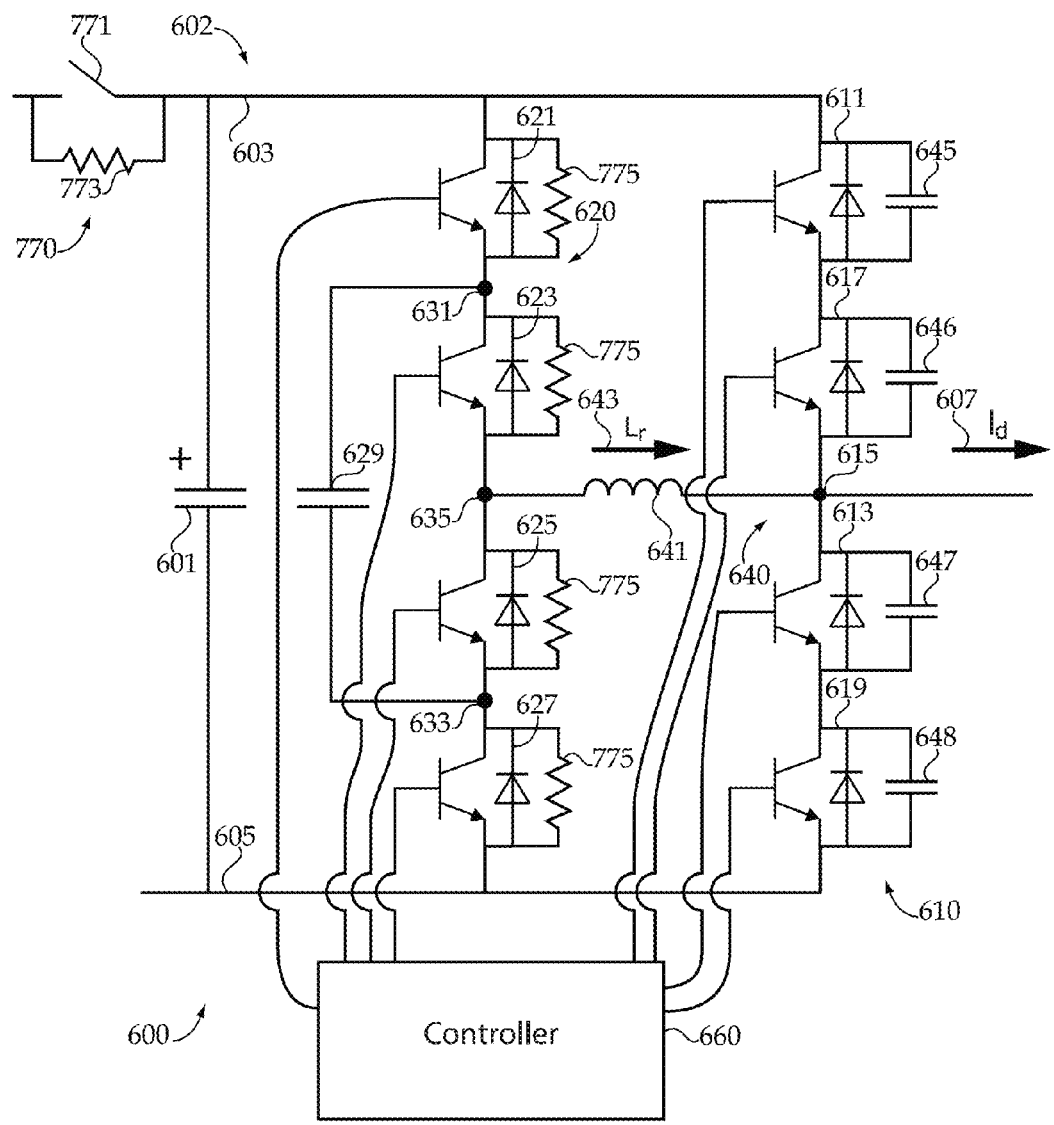

With reference to FIG. 7, there is illustrated converter 600 additionally including a charging circuit 770 and a plurality of charging resistors 775. With reference to FIG. 6, there is illustrated an exemplary ZVT PWM resonant converter 600. It shall be appreciated that any or all of the foregoing features of converter 600 may also be present in converter 600. Converter 600 is coupled to a direct current (DC) power source having a positive pole and a negative pole. Converter 600 includes a DC bus 602 having a DC bus positive rail 603 coupled to the positive pole of the DC power source and a DC bus negative rail 605 coupled to the negative pole. A smoothing capacitor 601 is coupled between rail 603 and rail 605.

Converter 600 further includes a plurality of primary switching devices 610 coupled in parallel to the DC power source by way of the DC bus 602. The pair 610 includes a first primary switching device 611 having a first terminal electrically coupled to rail 603 and a second terminal electrically coupled to a first terminal of a second primary switching device 611. A second terminal of the second primary switching device 617 is electrically coupled to an output node 615. A first terminal of a third primary switching device 613 is coupled to output node 615 and the second terminal of the third primary switching device 613 is coupled to a first terminal of a fourth primary switching device 619 and the second terminal of the fourth primary switching device 619 is coupled to the negative DC bus rail 605.

Converter 600 further includes an auxiliary flying capacitor (FC) circuit 620 having a plurality of FC switching devices 621, 623, 625, and 627, a flying capacitor 629, an FC circuit output node 635, and flying capacitor nodes 631 and 633. A first terminal of FC switching device 621 is coupled to DC bus positive rail 603. A second terminal of FC switching device 621 is coupled to flying capacitor node 631. A first terminal of switching device 623 is coupled to flying capacitor node 631 and a second terminal of switching device 623 is coupled to FC output node 635. A first terminal of switching device 625 is coupled to FC output node 635 and a second terminal of switching device 625 is coupled to flying capacitor node 633. A first terminal of switching device 627 is coupled to flying capacitor node 633 and a second terminal of switching device 627 is coupled to negative bus rail 605. The cathode of the flying capacitor 629 is coupled to flying capacitor node 631 and the anode of flying capacitor 629 is coupled to flying capacitor node 633. Each of the FC switching devices 621, 623, 625, and 627 may be rated for half the voltage across the DC power source.

Converter 600 additionally includes a resonant tank circuit 640 having a first resonant capacitor 645 coupled in parallel to switching device 611, a second resonant capacitor 646 coupled in parallel to switching device 617, a third resonant capacitor 647 coupled in parallel with switching device 613, and a fourth resonant capacitor 648 coupled in parallel with switching device 619. Circuit 640 additionally includes a resonant inductor 641 electrically coupled between FC output node 635 and output node 615.

Converter 600 additionally includes a charging circuit 770 coupled to the positive DC bus rail 603 between the DC power source and the auxiliary flying capacitor circuit 120. The charging circuit 700 a switching device 771 and a resistor 773 coupled in parallel to switching device 771. Resistor 773 is structured to allow a charging current to flow from the DC power source to smoothing capacitor 601 so as to initially charge smoothing capacitor 601. Resistor 773 is additionally structured to allow a small amount of current to flow from the DC power source to the flying capacitor 629 by way of a plurality of FC charging resistors 775 coupled in parallel to each of the FC switches devices 621, 623, 625, and 627 so as to maintain a charge across the flying capacitor 629.

Converter 600 additionally includes a controller 660 electrically coupled to FC switching devices 621, 623, 625, and 627, as well as primary switching devices 645 and 647. In addition to the features of controller 160 of converter 100 in FIG. 1 and controller 660 of converter 600 in FIG. 6, controller 660 is additionally structured to initially charge the flying capacitor by opening switching device 771, forcing current to pass through resistor 773 thereby reducing the current flowing to flying capacitor 629 by way of charging resistors 775.

Further written description of a number of exemplary embodiments shall now be provided. One embodiment is a zero-voltage transition PWM resonant converter comprising a DC bus including a first rail and a second rail; a first switching device coupled with the first rail and a converter output node; a second switching device coupled with the second rail and the converter output node; a resonant tank circuit comprising a first resonant capacitor, a second resonant capacitor, and a resonant inductor coupled with the converter output node; an auxiliary circuit including a plurality of auxiliary switching devices coupled in series between the first rail and the second rail and a flying capacitor coupled in parallel across two of the auxiliary switching devices, the resonant inductor being coupled to a node intermediate the said two of the auxiliary switching devices; and a controller structured to control the first switching device, the second switching device, and the plurality of auxiliary switching devices to provide resonant operation of the tank circuit effective to provide a substantially zero voltage condition across the first switching device when turning the first switching device on or off and to provide a substantially zero voltage condition across the second switching device when turning the second switching device on or off.

In certain forms of the foregoing converter, the plurality of auxiliary switching devices comprise first, second, third and fourth auxiliary switching devices coupled in series between the first rail and the second rail, the flying capacitor is coupled in parallel across the second and third auxiliary switching devices, and the resonant inductor is coupled to a node intermediate the second and third auxiliary switching devices. In certain forms, the controller is structured to execute a commutation scheme in which the first auxiliary switching device is turned on at a first time with the first switch off and the second switch on effective to increase the resonant inductor current and the second switch is turned off under the substantially zero voltage condition at a second time greater than the first time effective to provide resonant operation of the tank circuit. In certain forms, the first switching device is turned on at a third time greater than the second time when the voltage across the first switching device become substantially zero due to resonant operation of the tank circuit. In certain forms, the flying capacitor comprises a film capacitor.

Another exemplary embodiment is a zero-voltage transition converter coupled to a direct current (DC) power source having a positive pole and a negative pole, the converter comprising a first primary switching device having a first terminal electrically coupled to the positive pole of the DC power source, and a second terminal electrically coupled to a load; second primary switching device having a first terminal electrically coupled to the load and a second terminal coupled to the negative pole of the DC power source; a first resonant capacitor coupled in parallel to the first primary switching device; a second resonant capacitor coupled in parallel to the second primary switching device; a flying capacitor (FC) circuit electrically coupled to the power source and the load, the FC circuit comprising at least one flying capacitor and at least four FC switching devices; a resonant inductor electrically coupled with the first primary switch, second primary switch, the load and the FC circuit; and a controller structured to operate the first primary switching device and the second primary switching device by opening and closing the first primary switching device and the second primary switching device so as to convert DC power from the DC power source into output power and transmit the output power to the load, wherein the controller is structured to operate the FC switching devices so as to generate substantially zero voltage switching conditions across the first primary switching device and the second primary switching device during the opening and closing of the first primary switching device and the second primary switching device, and wherein the controller is structured to generate a resonating current by operating the FC switching devices such that a current flows through the resonant inductor.

In certain forms of the foregoing converter, the controller is structured to transmit a plurality of pulse width modulation signals to operate the first primary switching device, the second primary switching device, and the FC switching devices, the pulse width modulation signals causing either the closing of one of said devices to allow current to flow through the switching device or the opening of said one of said devices to prevent current from flowing through the device in at least one direction. In certain forms, the controller opens the first primary switching device during substantially zero voltage switching conditions by supplying an equal voltage to the first and second terminal of the first primary switching device and opens the second primary switching device during substantially zero voltage switching conditions by supplying an equal voltage to the first and second terminal of the second primary switching device. In certain forms, the controller operates the FC switching devices so as to charge the resonant inductor before the controller opens the one of the first primary switching device and the second primary switching device. In certain forms, the controller is structured to close one of the first primary switching device and the second primary switching device during a zero voltage switching condition by providing a current through the resonant inductor by operating the FC switching devices such that the resonant inductor, the first resonant capacitor and the second resonant capacitor achieve resonance, and closing the first primary switching device or the second primary switching device in response to achieving the zero voltage switching condition. In certain forms, the controller is structured to open one of the FC switching devices following the controller closing of the first primary switching device or the second primary switching device in response to a zero current condition at the FC switching device. In certain forms, the FC circuit comprises one flying capacitor having an anode and a cathode, and four FC switching devices, the first FC switching device having a first terminal electrically coupled to the positive pole of the DC power source and a second terminal electrically coupled to the cathode of the flying capacitor; the second FC switching device having a first terminal electrically coupled to the cathode of the flying capacitor and a second terminal electrically coupled to the inductive element; the third FC switching device having a first terminal electrically coupled to the inductive element and a second terminal electrically coupled to the anode of the flying capacitor; and the fourth FC switching device having a first terminal electrically coupled to the anode of the flying capacitor and a second terminal electrically coupled to the negative pole of the DC power source. In certain forms, the converter additionally comprises a charging circuit structured to charge the flying capacitor wherein the charging circuit is coupled between the DC power source and the flying capacitor circuit, the charging circuit comprising a switching device and a resistive element coupled in parallel. In certain forms, the converter additionally comprises resistors coupled in parallel to at least one of the FC switching devices, the resistance of each resistor being sufficient to allow current to flow to the flying capacitor. In certain forms, the resonant inductor comprises a soft-saturation magnetic material.

A further exemplary embodiment is a method for generating an output power by operating a pulse width modulation converter coupled to a DC power source comprising operating circuitry including a flying capacitor circuit having a flying capacitor and a plurality of semiconductor switches coupled in parallel with the DC power source, a pair of primary semiconductor switches coupled in parallel with the DC power source, a resonant tank circuit having a resonant inductor and two resonant capacitors to, the resonant tank circuit coupled with the flying capacitor circuit, the pair of primary switches, and a load; generating a resonating current in the resonant tank by operating the flying capacitor circuit such that the voltage across one of the primary semiconductor switches is a substantially zero voltage condition; opening one switch of the primary semiconductor switches; closing the other of the pair of primary semiconductor switches in a substantially zero voltage condition; and reducing the current in the resonant inductor by generating a midpoint voltage with the flying capacitor circuit.

In certain forms of the foregoing method, the output power is alternating current power. In certain forms, the method additionally comprises charging the resonant inductor by opening a semiconductor device of the flying capacitor circuit between the DC power source and the flying capacitor. In certain forms the substantially zero voltage condition is a voltage with a magnitude of zero or a small percentage of the DC power source voltage. In certain forms, the substantially zero voltage condition is a voltage with a magnitude less than 20% of the DC power source voltage.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A zero-voltage transition PWM resonant converter comprising:
    a DC bus including a first rail and a second rail;
    a first switching device coupled with the first rail and a converter output node;
    a second switching device coupled with the second rail and the converter output node;
    a resonant tank circuit comprising a first resonant capacitor coupled in parallel with the first switching device, a second resonant capacitor coupled in parallel with the second switching device, and a resonant inductor coupled with the converter output node;
    an auxiliary circuit including a plurality of auxiliary switching devices coupled in series between the first rail and the second rail and a flying capacitor coupled in parallel across two of the auxiliary switching devices, the resonant inductor being coupled to a node intermediate the said two of the auxiliary switching devices; and
    a controller structured to control the first switching device, the second switching device, and the plurality of auxiliary switching devices to provide resonant operation of the tank circuit effective to provide a substantially zero voltage condition across the first switching device when turning the first switching device on or off and to provide a substantially zero voltage condition across the second switching device when turning the second switching device on or off,
    wherein after all of the plurality of switching devices are opened, current no longer flows through the resonant inductor.

2. The converter of claim 1 wherein the plurality of auxiliary switching devices comprise first, second, third and fourth auxiliary switching devices coupled in series between the first rail and the second rail, the flying capacitor is coupled in parallel across the second and third auxiliary switching devices, and the resonant inductor is coupled to a node intermediate the second and third auxiliary switching devices.

3. The converter of claim 2 wherein the controller is structured to execute a commutation scheme in which the first auxiliary switching device is turned on at a first time with the first switch off and the second switch on effective to increase the resonant inductor current and the second switch is turned off under the substantially zero voltage condition at a second time greater than the first time effective to provide resonant operation of the tank circuit.

4. The converter of claim 3 wherein the first switching device is turned on at a third time greater than the second time when the voltage across the first switching device become substantially zero due to resonant operation of the tank circuit.

5. The converter of claim 4 wherein the flying capacitor comprises a film capacitor.

6. A zero-voltage transition converter coupled to a direct current (DC) power source having a positive pole and a negative pole, the converter comprising:
    a first primary switching device having a first terminal electrically coupled to the positive pole of the DC power source, and a second terminal electrically coupled to a load;
    a second primary switching device having a first terminal electrically coupled to the load and a second terminal coupled to the negative pole of the DC power source;
    a first resonant capacitor coupled in parallel to the first primary switching device;
    a second resonant capacitor coupled in parallel to the second primary switching device;
    a flying capacitor (FC) circuit electrically coupled to the power source and the load, the FC circuit comprising at least one flying capacitor and at least four FC switching devices;
    a resonant inductor electrically coupled with the first primary switch, second primary switch, the load and the FC circuit; and
    a controller structured to operate the first primary switching device and the second primary switching device by opening and closing the first primary switching device and the second primary switching device so as to convert DC power from the DC power source into output power and transmit the output power to the load,
    wherein the controller is structured to operate the FC switching devices so as to generate substantially zero voltage switching conditions across the first primary switching device and the second primary switching device during the opening and closing of the first primary switching device and the second primary switching device,
    wherein the FC circuit and resonant tank are structured to allow no current to pass through the resonant inductor after opening one of the FC switching devices, and
    wherein the controller is structured to generate a resonating current by operating the FC switching devices such that a current flows through the resonant inductor.

7. The converter of claim 6, wherein the controller is structured to transmit a plurality of pulse width modulation signals to operate the first primary switching device, the second primary switching device, and the FC switching devices, the pulse width modulation signals causing either the closing of one of said devices to allow current to flow through the switching device or the opening of said one of said devices to prevent current from flowing through the device in at least one direction.

8. The converter of claim 7, wherein the controller opens the first primary switching device during substantially zero voltage switching conditions by supplying an equal voltage to the first and second terminal of the first primary switching device and opens the second primary switching device during substantially zero voltage switching conditions by supplying an equal voltage to the first and second terminal of the second primary switching device.

9. The converter of claim 8, wherein the controller operates the FC switching devices so as to charge the resonant inductor before the controller opens the one of the first primary switching device and the second primary switching device.

10. The converter of claim 7, wherein the controller is structured to close one of the first primary switching device and the second primary switching device during a zero voltage switching condition by providing a current through the resonant inductor by operating the FC switching devices such that the resonant inductor, the first resonant capacitor and the second resonant capacitor achieve resonance, and closing the first primary switching device or the second primary switching device in response to achieving the zero voltage switching condition.

11. The converter of claim 10, wherein the controller is structured to open one of the FC switching devices following the controller closing of the first primary switching device or the second primary switching device in response to a zero current condition at the FC switching device.

12. The converter of claim 6, wherein the FC circuit comprises one flying capacitor having an anode and a cathode, and four FC switching devices, the first FC switching device having a first terminal electrically coupled to the positive poles of the DC power source and a second terminal electrically coupled to the cathode of the flying capacitor, the second FC switching device having a first terminal electrically coupled to the cathode of the flying capacitor and a second terminal electrically coupled to the inductive element; the third FC switching device having a first terminal electrically coupled to the inductive element and a second terminal electrically coupled to the anode of the flying capacitor; and the fourth FC switching device having a first terminal electrically coupled to the anode of the flying capacitor and a second terminal electrically coupled to the negative pole of the DC power source.

13. The converter of claim 6, wherein the converter additionally comprises a charging circuit structured to charge the flying capacitor wherein the charging circuit is coupled between the DC power source and the flying capacitor circuit, the charging circuit comprising a switching device and a resistive element coupled in parallel.

14. The converter of claim 13, wherein the converter additionally comprises resistors coupled in parallel to at least one of the FC switching devices, the resistance of each resistor being sufficient to allow current to flow to the flying capacitor.

15. The converter of claim 6, wherein the resonant inductor comprises a soft-saturation magnetic material.

16. A method for generating an output power by operating a pulse width modulation converter coupled to a DC power source comprising:
    operating circuitry including
    a flying capacitor circuit having a flying capacitor and a plurality of semiconductor switches coupled in parallel with the DC power source,
    a pair of primary semiconductor switches coupled in parallel with the DC power source,
    a resonant tank circuit having a resonant inductor and two resonant capacitors, the resonant tank circuit coupled with the flying capacitor circuit, the pair of primary switches, and a load;
    generating a resonating current in the resonant tank by operating the flying capacitor circuit such that the voltage across one of the primary semiconductor switches is a substantially zero voltage condition;
    opening one switch of the primary semiconductor switches;
    closing the other of the pair of primary semiconductor switches in a substantially zero voltage condition; and
    reducing the current in the resonant inductor by generating a midpoint voltage with the flying capacitor circuit.

17. The method of claim 16, wherein the output power is alternating current power.

18. The method of claim 16, additionally comprising charging the resonant inductor by opening a semiconductor device of the flying capacitor circuit between the DC power source and the flying capacitor.

19. The method of claim 16, wherein the substantially zero voltage condition is a voltage with a magnitude of zero or a small percentage of the DC power source voltage.

20. The method of claim 19, wherein the substantially zero voltage condition is a voltage with a magnitude less than 20% of the DC power source voltage.

* * * * *